United States Patent
Ortega

(10) Patent No.: US 8,346,583 B2
(45) Date of Patent: Jan. 1, 2013

(54) ECONOMIC OPPORTUNITY PURSUIT MANAGEMENT AND PRESENTATION GENERATION

(75) Inventor: Robert J. Ortega, Moravian Falls, NC (US)

(73) Assignee: Wells Fargo Bank, N.A., Charlotte, NC (US)

( * ) Notice: Subject to any disclaimer, the term of this patent is extended or adjusted under 35 U.S.C. 154(b) by 1247 days.

(21) Appl. No.: 11/861,990

(22) Filed: Sep. 26, 2007

(65) Prior Publication Data

US 2009/0083113 A1    Mar. 26, 2009

(51) Int. Cl.
*G06F 3/00* (2006.01)
(52) U.S. Cl. .................................. 705/7.11; 715/730
(58) Field of Classification Search .................... 715/730
See application file for complete search history.

(56) References Cited

U.S. PATENT DOCUMENTS

| | | | |
|---|---|---|---|
| 5,406,476 A * | 4/1995 | Deziel et al. .................. | 705/7.15 |
| 6,112,181 A | 8/2000 | Shear et al. | |
| 6,349,290 B1 * | 2/2002 | Horowitz et al. ............... | 705/35 |
| 6,484,152 B1 | 11/2002 | Robinson | |
| 6,675,159 B1 | 1/2004 | Lin et al. | |
| 6,850,252 B1 | 2/2005 | Hoffberg | |
| 6,952,688 B1 | 10/2005 | Goldman et al. | |
| 7,181,438 B1 | 2/2007 | Szabo | |
| 7,428,704 B2 * | 9/2008 | Baker et al. .................... | 715/730 |
| 2002/0016756 A1 * | 2/2002 | Rinaldi .......................... | 705/36 |
| 2002/0062272 A1 | 5/2002 | Kim et al. | |
| 2002/0087446 A1 * | 7/2002 | Reddy .............................. | 705/36 |
| 2002/0103885 A1 | 8/2002 | Hamada | |
| 2004/0210520 A1 | 10/2004 | Fitzgerald et al. | |
| 2005/0159996 A1 | 7/2005 | Lazarus et al. | |
| 2005/0187851 A1 | 8/2005 | Sant | |
| 2007/0036320 A1 * | 2/2007 | Mandalia et al. ........ | 379/210.01 |
| 2007/0168868 A1 * | 7/2007 | Korzenko et al. ............. | 715/732 |
| 2007/0244775 A1 * | 10/2007 | Linder ............................. | 705/35 |

OTHER PUBLICATIONS

Brownstone, David M. The VNR Investors Dictionary, Copyright 1981.*
System and Method for Knowledge Retrieval, Management, Delivery and Presentation Omoigui Nosa, Patent: WO 200301413 A1 20030103 (WO 0301413) Jan. 3, 2003.*
Merrill Corporation. Merrill DataSite (Virtual Deal Rooms). The premier virtual data room (VDR) solution for the financial industry. http://www.merrillcorp.com/cps/rde/xchg/merrillcorp/hs.xsl/548_583.htm. Last accessed Jan. 28, 2008.
Final Office Action dated Mar. 18, 2009 for U.S. Appl. No. 11/861,950, 26 pages.
Final Office Action dated Mar. 30, 2009 for U.S. Appl. No. 11/861,969, 22 pages.

* cited by examiner

*Primary Examiner* — William Rankins
(74) *Attorney, Agent, or Firm* — Kegler Brown Hill & Ritter; James J. Pingor

(57) ABSTRACT

A common manner for disclosing information is through a presentation. A presentation is generated automatically to pursue a financial opportunity, such as to disclose to a potential client rationale to purchase a product. In addition, auxiliary tasks that relate to the presentation can be handled automatically, such as sending notices and assigning individuals to disclose the presentation.

16 Claims, 12 Drawing Sheets

ECONOMIC OPPORTUNITY PURSUIT MANAGEMENT AND PRESENTATION GENERATION

CROSS-REFERENCE

This application relates to U.S. patent application Ser. No. 11/861,950 entitled "FINANCIAL OPPORTUNITY INFORMATION OBTAINMENT AND EVALUATION" filed on Sep. 26, 2007. The entirety of which is incorporated by reference herein.

This application relates to U.S. patent application Ser. No. 11/861,969 entitled "PRODUCT AND SERVICE MANIPULATION FOR OPPORTUNITY PURSUIT" filed on Sep. 26, 2007. The entirety of which is incorporated by reference herein.

This application relates to U.S. patent application Ser. No. 11/832,600 entitled "ONLINE ORIGINATION MACHINE" filed on Aug. 1, 2007. The entirety of which is incorporated by reference herein.

TECHNICAL FIELD

The subject specification relates generally to pursuit of a financial prospect and in particular to generating a presentation for pursuit of the economic opportunity and managing related tasks.

BACKGROUND

Traditional presentations allow relatively large amounts of information to be presented in a number of different ways. A group of people can be witness to a single presentation, with individuals gaining different knowledge and experience from the presentation. Presentations can be static or dynamic; in a static presentation, information is disseminated and the group appreciates the information with little to no interaction. With a dynamic presentation, group members are engaged in the presentation, where members can ask questions, influence direction of the presentation, etc.

One form of common presentation is a slide show, where pictures are shown and a narrator provides insight to context of the pictures. The narrator can answer questions posed by audience members and shift the presentation to a direction suitable for the audience. Pre-recorded audio presentations allow information to be disclosed on more the one occasion when they are stored digitally. Since there is no live narrator, pre-recorded audio presentations tend to be static in nature.

Recent technological developments have enhanced capabilities of existing presentation types, but also created new presentation formats. For instance, a computer program can be implemented to disclose a slide show presentation. In addition, various features can integrate with the slide show presentation in one application. A single slide show presentation can include different wipes that transition between slides (e.g., different wipes used in a single slide show), auto files that play automatically or on command, links to a data network, etc. New presentations are also available due to technological developments, such as video conferencing over a data network.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventionally, creation of a presentation for pursuit of a financial opportunity and coordination of related matters are performed manually. When a presentation is to be constructed, a person or team determines what should be placed in the presentation based upon available information. In addition, scheduling of the presentation, assigning individuals to the financial opportunity, and performing supplemental actions are performing by individuals (e.g., administrative assistants).

The disclosed innovation allows for automatic presentation generation and task management. A financial opportunity and metadata are evaluated and based upon the evaluation, a presentation is generated upon an appropriate medium. Generally, there are a number of tasks associated with the generated presentation, such as scheduling time for when the presentation should be disclosed, follow-up messages, editing of the presentation, etc.—in practice of the disclosed innovation, tasks can be managed automatically.

The disclosed innovation goes against current market trends and developments. Clients not only see many presentations, but presentations are also commonly one of the main factors used by a client in deciding to use a presenting entity. Therefore, developments have focused on training individuals to develop sharp presentations. Client interaction, especially relatively 'cold' interaction (e.g., newer interactions) is seen as too important to leave to automation. Additionally, selecting people and managing tasks are also seen as too important for automation since the can influence client relations. People associated with the presentation can be highly influential in determining if a product/service will be sold. In addition, many related tasks are specific in nature such that the industry instructs individuals to manage the tasks in case problems arise. However, unexpected results are achieved when automating presentation generation and task management. Presentations can be of a high quality and tasks are performed in an efficient manner when accomplished through automatic implementation. This allows for an unexpected benefit of relatively high quality product (e.g., presentation and task management) with relatively little human involvement.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
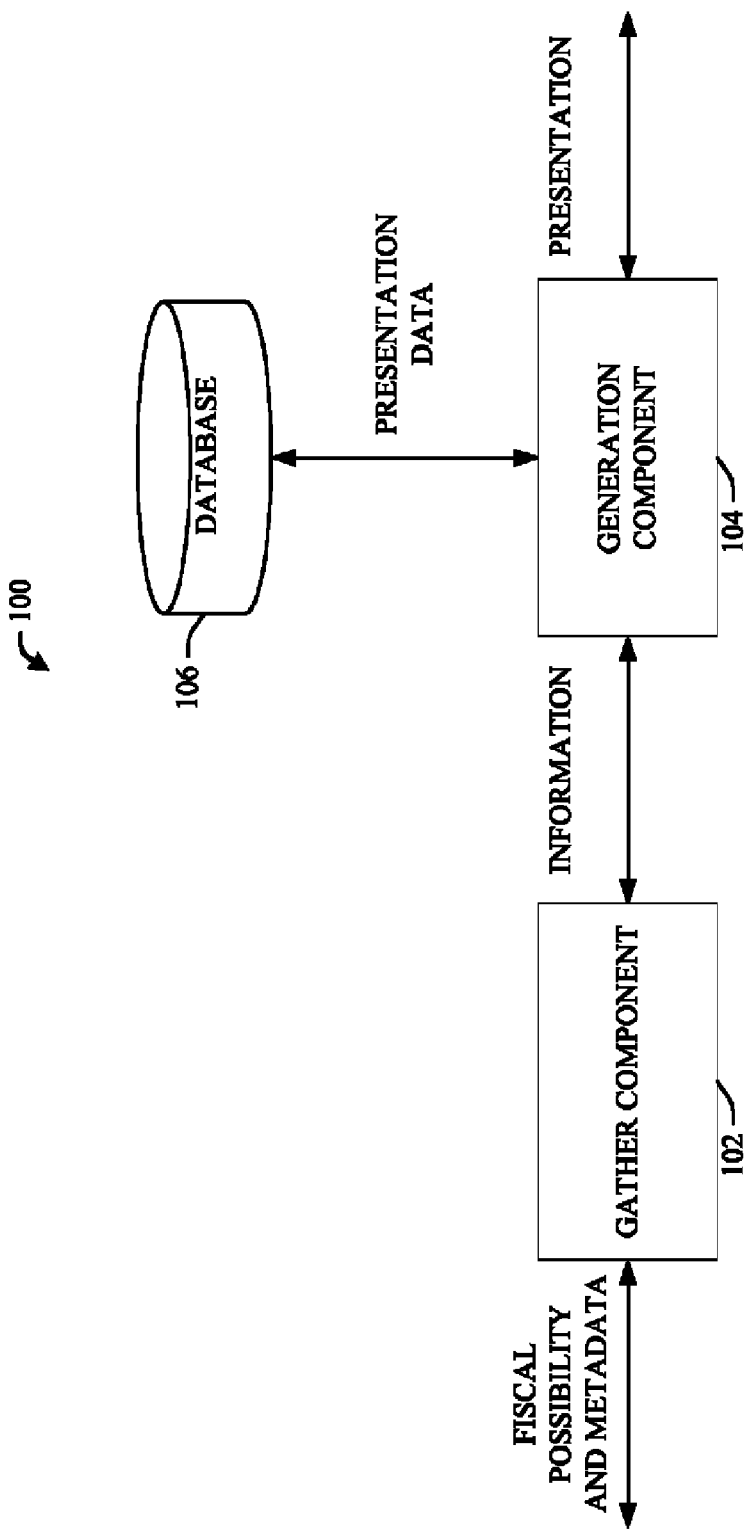
FIG. 1 illustrates a representative presentation generation system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

FIG. 1 discloses an example system 100 for presentation generation. To pursue a fiscal possibility, a presentation can be generated that is to be disclosed to parties related to the fiscal possibility. A gather component 102 obtains information that relates to a fiscal possibility, generally the fiscal possibility itself as well as metadata. Typically, the fiscal possibility has been analyzed prior to retention by the gather component 102. Thus, metadata can include analysis results, information upon which a financial possibility is based, potential products and/or services for use in pursuit of the fiscal opportunity, etc. The gather component 102 transfers information relating to the fiscal possibility to a generation component 104.

According to one embodiment, financial opportunities are investment banking opportunities such as underwriting (e.g., debt or equity), Initial Public Offerings, Merger & Acquisition advising; Private equity; Finance re-structuring, etc. Opportunities can include bringing a company public or bringing a company private, determining which two companies would do better together, which company will do better broken apart, etc. A goal of a financial opportunity can be to receive authorization for an investment bank to represent a client on a matter. Potential financial opportunities (e.g., investment baking opportunities) can be collected via a rules based and/or semantic search engine, Internet browser based application for investment banking, service request capture, Internet browser based application for capturing investment banking opportunity referral, etc.

A generation component 104 creates a presentation that relates to the fiscal possibility based upon the obtained information. Commonly, a financial opportunity involves supplying a product or service (e.g., combination of inter-related products and services) to an entity. In order to convince the entity to use the product or service, a presentation can be constructed that can convey rationale for utilization of the product and or service. According to one embodiment, the presentation discloses several groupings of suggested product(s) or service(s), relevant statistics (e.g., historical profits of similar transactions), and examples of previous transactions. The generation component 104 can generate presentations for financial opportunities that are not normally pursued (e.g., small transactions, transactions in obscure industries, transactions in an industry not normally pursued by an entity operating the system 100, etc.). The generation component 104 can perform as a means for generating a presentation for use in pursuit of the financial opportunity.

A presentation can include a digital slide show, a word processing document, an audio speech, brochure, spreadsheet, pitchbook, etc. The generation component 104 can access a database 106 and obtain presentation data. Presentation data can include parameters upon which to base a presentation. Based upon received information and presentation data, a presentation is constructed that furthers pursuit of the financial opportunity.

In an illustrative example, a financial opportunity pursuit can include a performance of a presentation at an industry conference and information relating to the conference can transfer from the database 106 to the generation component 104 (e.g., maximum presentation lengths). The generation component 102 can construct a slide show presentation and a paper presentation that are intended to work in conjunction with one another (e.g., guests can follow along with the slide show presentation through use of the paper presentation). The slide show presentation and paper presentation can include an explanation of the opportunity, why a presenting firm is best suited for operation of the opportunity, suggested products/service for opportunity achievement, etc.

Figure 2:
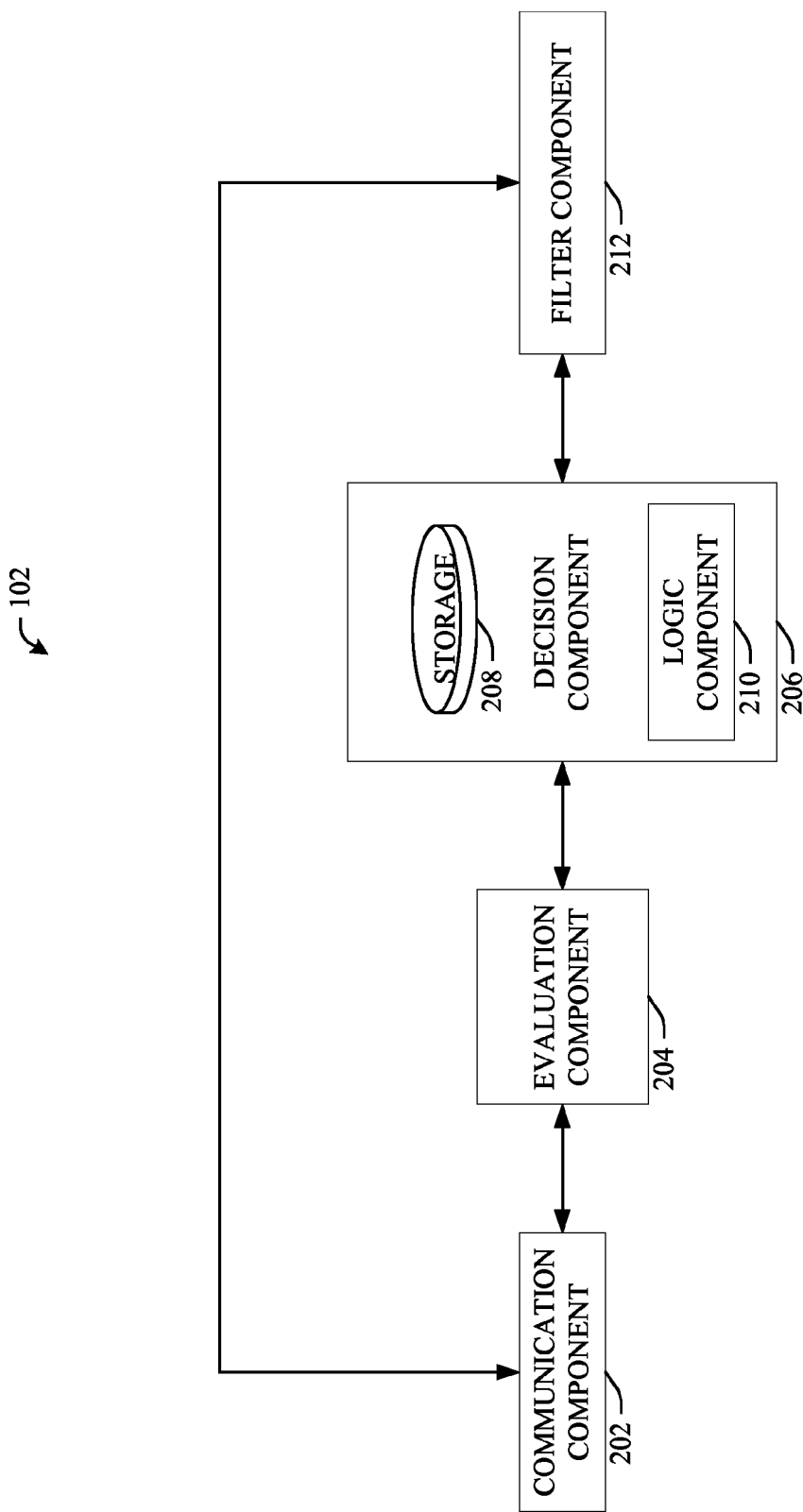
FIG. 2 illustrates a representative gather component in accordance with an aspect of the subject specification.

FIG. 2 discloses an example gather component 102 in accordance with an aspect of the subject specification. A communication component 202 enables the gather component 102 to interact with other units. The gather component 202 can be utilized to enable devices of the collection component 102 to engage other devices (e.g., an analysis component) in a wireless manner, through a hard wire configuration, etc. Security features can be implemented by the communication component 202, such as checking for errors that can disrupt the gather component 102 (e.g., viruses).

An evaluation component 204 analyzes obtained information, where at least one result of the analysis is used in selection of an appropriate presentation medium. Analysis can take place through use of various algorithms and machine learning. For instance, a financial opportunity can be for a larger company to acquire a smaller company to allow for penetration in a new market. The evaluation component 204 can determine a likely audience that will receive a presentation and determine the audience's likely familiarity with the smaller company.

A decision component 206 makes at least one resolution related to presentation creation. A vast amount of information can be available to the system 100 of FIG. 1. The decision component 206 can determine information that is relevant in presentation generation (e.g., through artificial intelligence techniques). Other determinations can be made by the decision component 206, such as determining if a financial opportunity should be pursued (e.g., even if a determination is made at another location, the decision component 206 can perform another check).

The decision component can include storage 208 as well as a logic component 210. Storage 208 can be used as an area to hold obtained information (e.g., the financial opportunity and metadata). The decision component 206 makes determinations upon the held information. In addition, the storage 208 can operate as a holding location for instructions used by components of the system 100 of FIG. 1 (e.g., addresses of various components that are engaged by the communication component 202). Storage 208 can implement as flash memory, battery backed memory, hard disk, magnetic tape, etc.

The logic component 210 is utilized by the decision component 206 in making resolutions concerning obtained information. The logic component 210 can differentiate between information that is likely to be used in a presentation (e.g., a selected product) as well as extra information that will likely not be used (e.g., name of an editor of an article used to determine the financial possibility). The decision component 206 can have the ability to train the logic component 210 such that modifications can be made in logic component 210 operation (e.g., through artificial intelligence techniques).

A filter component 212 dismisses information that is not relevant in regards to pursuit of a financial opportunity (e.g., presentation generation, scheduling, take management, etc.). Information that is not dismissed can be transmitted to the generation component 104 of FIG. 1. The filter component 212 can use the communication component 202 for the transmission.

Figure 3:
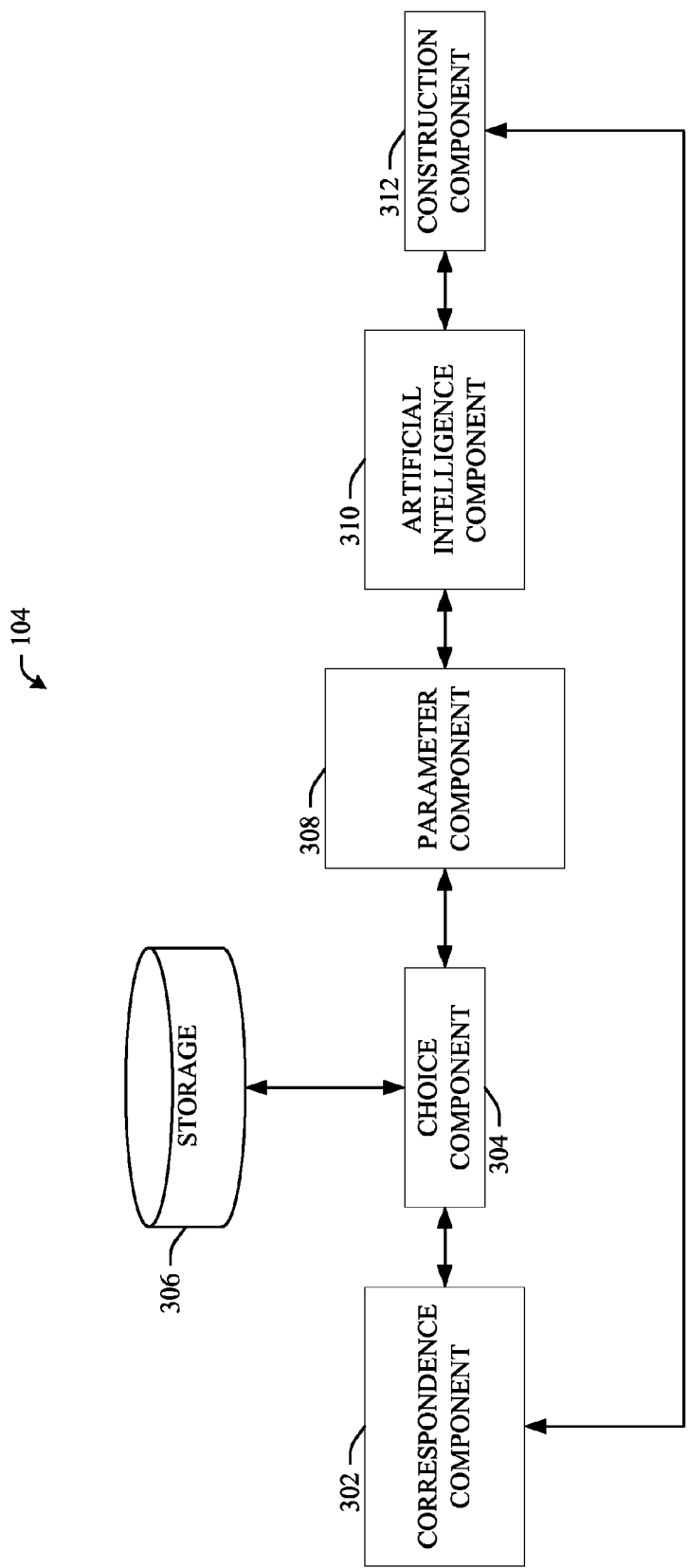
FIG. 3 illustrates a representative generation component in accordance with an aspect of the subject specification.

FIG. 3 discloses an example generation component 104 in accordance with an aspect of the subject specification. A correspondence component 302 enables the generation component 104 to interact with other units. The correspondence component 302 can be utilized to enable devices of the generation component 104 to engage other devices (e.g., an analysis component) in a wireless manner, through a hard wire configuration, etc. Security features can be implemented by the correspondence component 302, such as checking for errors that can disrupt the generation component 104 (e.g., viruses).

A choice component 304 selects an appropriate presentation medium based on obtained information. Depending on contextual factors (e.g., factors obtained by the correspondence component 302) that relate to a presentation, different mediums can be appropriate for the presentation. For instance, if a presentation is to be disclosed multiple times, then a presentation medium should be selected that can be duplicated with relative ease (e.g., a computer file that can have contents printed with few commands). Selection of an appropriate presentation medium can include selecting parameters related to the presentation (e.g., length of the presentation, size of the presentation, etc.).

Storage 306 can operate as a temporary information holding location for the system 100 of FIG. 1. Various operations can be performed upon information held in storage 306. In addition, the storage 306 can possess a cache of commonly used products and services obtained from the database 106 of FIG. 1 to allow quick operation of the generation component 104. Storage 306 can implement as flash memory, battery backed memory, hard disk, magnetic tape, etc.

A parameter component 308 evaluates characteristics taken into account in creation of a fiscal possibility presentation. For instance, a presentation medium can be a digital slide show presentation; example characteristics include file size, number of slides, color/grayscale, estimated length of verbal discussion associated with the presentation, etc.

The artificial intelligence component 306 makes at least one inference or at least one determination in relation to the presentation. Various scenarios can occur that are processed by the artificial intelligence component 306. For example, the artificial intelligence component 306 can determine that selections made by the choice component 304 have not yielded beneficial results (e.g., clients are not allowing an institution running the system 100 of FIG. 1 to take advantage of a fiscal prospect.) The artificial intelligence component 306 can then infer that a modification should be made to operating logic of the choice component 304; the artificial intelligence component 306 can implement the modification.

Artificial intelligence component 306 can employ one of numerous methodologies for learning from data and then drawing inferences and/or creating making determinations related to association of a representation (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems. A rules based investment banking product matching software engine, rules based investment banking presentation scheduler engine, and/or automated investment banking pitchbook presentation generation are examples of aspects that can be implemented through artificial intelligence techniques.

A construction component 312 builds the presentation, typically using output of the parameter component to build the presentation. For instance, a parameter can be that a digital slide show should have no more then about twenty digital slides; a presentation is build with the suggested limitation of no more then about twenty slides. The construction component 312 can use the correspondence component 302 to emit the presentation.

Figure 4:
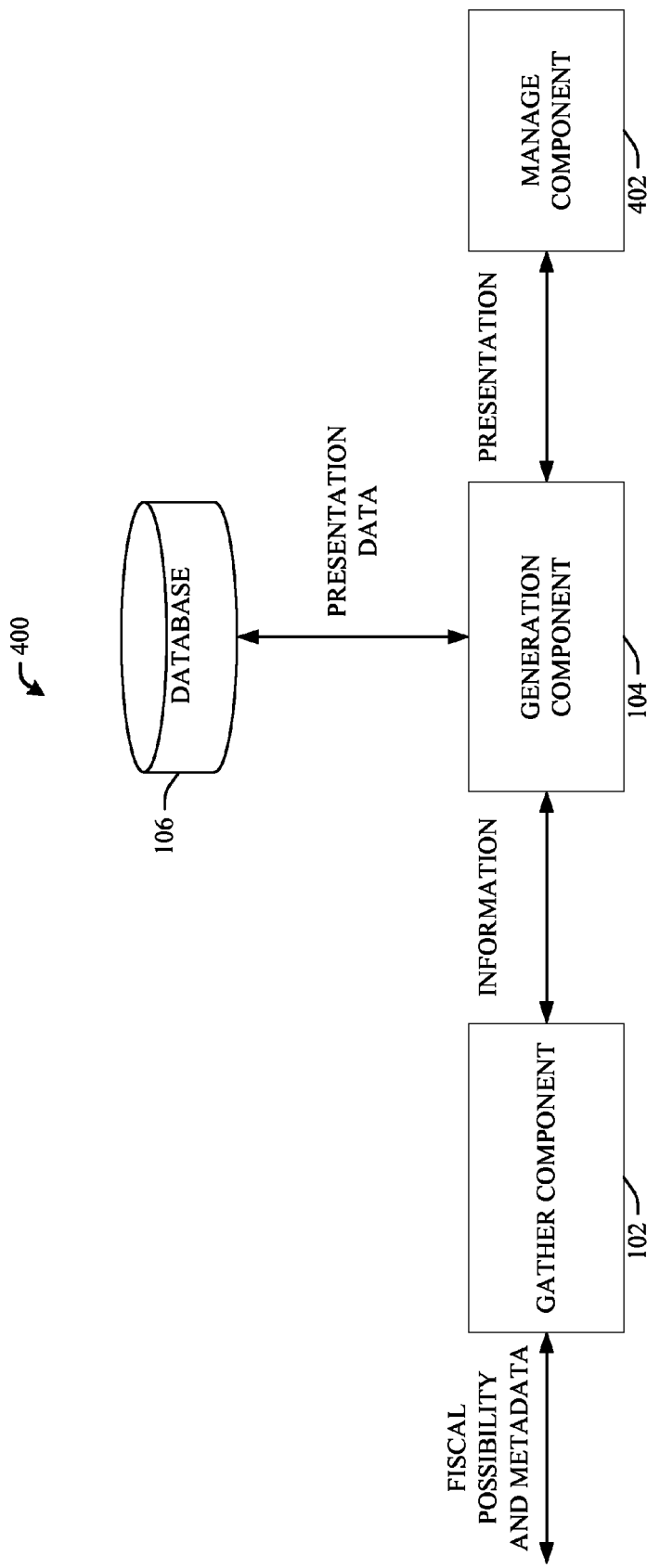
FIG. 4 illustrates a representative presentation generation system with a manage component in accordance with an aspect of the subject specification.

FIG. 4 discloses an example system 400 for processing tasks associated with a generated presentation. A gather component 102 obtains information (e.g., a fiscal possibility and metadata) that relates to a fiscal possibility. Obtained information transfers to a generation component 104 that creates a presentation that relates to the fiscal possibility based upon the obtained information. The generation component 104 can use presentation data that is obtained from a database 106 or another location (e.g., downloaded from a data network) in building a presentation. The presentation can transfer from the generation component 104 to a manage component 402.

The manage component 402 processes at least on task that relates to pursuit of the financial opportunity, commonly in light of a generated presentation. A relatively large number of tasks can associate with the financial opportunity and a related presentation. Example tasks include scheduling presentation times, coordinating follow-up interviews, evaluating other tasks that should be perfumed to increase a likelihood of success, etc. The manage component 402 can automatically perform these tasks in further pursuit of a financial opportunity. The manage component 402 can function as a means for managing at least one task automatically.

Figure 5:
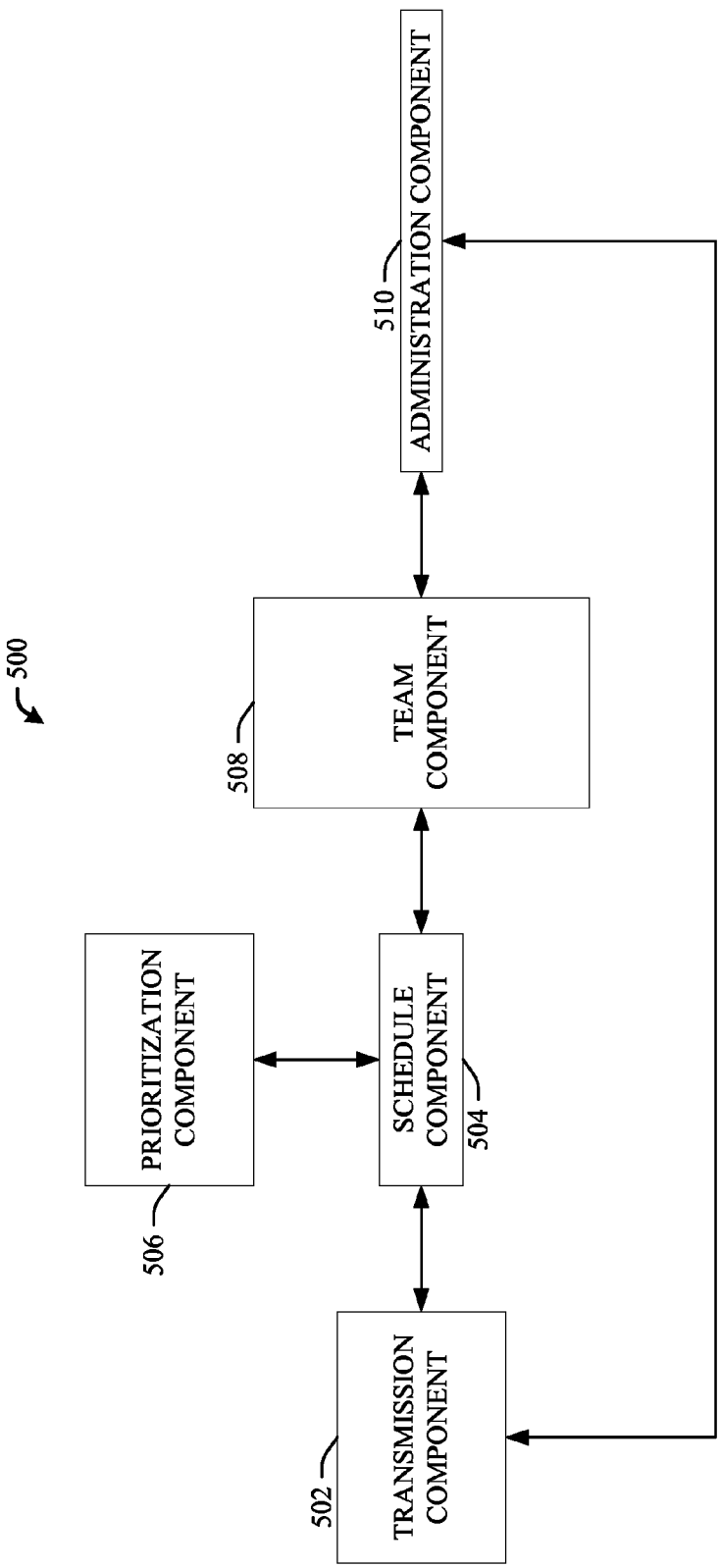
FIG. 5 illustrates a representative manage component in accordance with an aspect of the subject specification.

FIG. 5 discloses an example manage component 402 in accordance with an aspect of the subject specification. A transmission component 502 enables the manage component 502 to interact with other units. The transmission component 502 can be utilized to enable devices of the manage component 502 to engage other devices (e.g., an analysis component that evaluates potential opportunities by performing rules based analysis.) in a wireless manner, through a hard wire configuration, etc. Security features can be implemented by the transmission component 502, such as checking for errors that can disrupt the manage component 502 (e.g., viruses). The transmission component 502 can operate as a means for collecting a notice of at least one task that relates to a presentation for use in pursuit of a financial opportunity.

A schedule component 504 organizes time of at least one person as a function of the fiscal possibility. The schedule component 504 can organize time with regards to the person's experience, availability, interest, locality, contact, performance evaluation, or a combination thereof. Various employees can have schedules retained on a company database; the schedule component 504 can make a modification (e.g., add time) for a person related to the presentation. For instance, an editor can have one hour of time allotted for proofreading a presentation. The schedule component 504 can operate as a means for assigning a portion of time of at least one person, wherein assigned time is dedicated to pursuit of the financial opportunity.

A prioritization component 506 provides precedence data to the schedule component, where the schedule component bases organization of time at least in part off precedence data. It is common for different project to have varying levels of priority. For instance, a trial court appearance for a client that provides a large amount of business can be more important then a presentation to provide legal services to a large client with a low likelihood of hiring a company operating the system 500. The schedule component 504 can take the precedence data into account when organizing time (e.g., while an attorney can have open time available, time is not scheduled with relation to the fiscal opportunity since the attorney historically has high priority tasks to complete.)

A team component 508 organizes a cooperative to operate in conjunction with the created presentation. A group of individuals can be dedicated (e.g., partially dedicated, wholly dedicated, etc.) to pursuit of a fiscal prospect. Individuals with different expertise levels can attempt to complete a variety of tasks associated with a fiscal opportunity. For instance, a broker can disclose a presentation while a clerk creates copies of the presentation for audience distribution.

An administration component 510 regulates at least one auxiliary task associated with the presentation. A number of tasks can be performed automatically by the administration component 510. Tasks can be automatically managed, where management can include performing a task, assigning an individual to perform a task, monitoring to determine if a task has been completed and if it has not been completed, then automatically performing the task, etc. For instance, after a presentation has been completed, various reminders can be provided to broadcasters of the presentations to perform follow-up events, such as asking a potential client if they have questions concerning the presentation. In addition, the administration component 510 can automatically perform tasks, such as sending a message to a potential client similar to a message send by broadcaster. The administration component 510 can function as a means for managing at least one task automatically.

Figure 6:
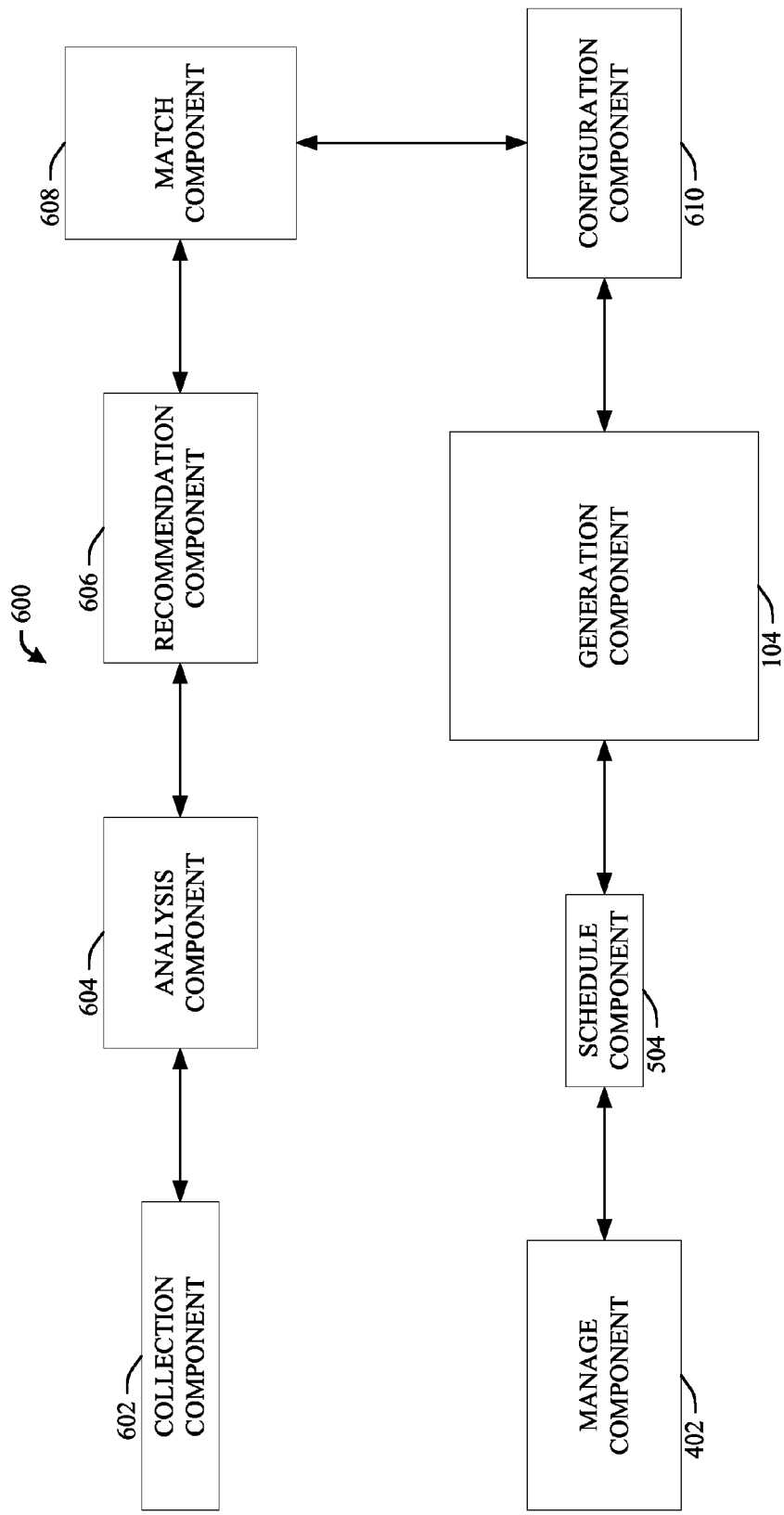
FIG. 6 illustrates a representative financial opportunity pursuit system in accordance with an aspect of the subject specification.

FIG. 6 discloses an example system 600 for processing of a fiscal prospect. A collection component 602 obtains information from a network. Information is typically gathered from a plurality of sources and transferred to analysis component 604 for evaluation. Information can be gathered from a user submission, from monitoring communication traffic, actively searching websites, etc.

The analysis component 604 evaluates the obtained information as a function of a financial opportunity. A set of rules is applied upon obtained information to determine if a financial opportunity should be pursued. The rules can be modified by a user or automatically if desirable results are not being achieved (e.g., bad fiscal prospects are pursued, good financial projects are being rejected, etc.). A decision if the financial opportunity should be pursued is made and the financial opportunity can be held for further observation, disposed, transferred to other portions of the system 600, etc.

If a financial opportunity is not to be pursued by a construct running the system 600, then a recommendation component 606 refers the financial opportunity to an auxiliary provider. The recommendation component 606 can rely on a selection component to choose at least one entity in which the recommendation component 606 can refer a financial opportunity. A recommendation can include evaluation information, however, a mere referral can also be provided.

If a referral does not take place and the system 600 is to continue in pursuit of a financial opportunity, then a match component 608 operates. The match component 608 selects at least one product or service for engagement of a fiscal possibility, commonly based off a result of the analysis component 604. A company can desire to gain capital to increase production. One option can be to take out a bank loan while another option can be to generate capital by taking the company public. The match component 608 selects a product or service that is appropriate for pursuit of the fiscal possibility. According to one embodiment, the match component 608 find a maximum combination of at least one service or at least one product (e.g., maximize profit for an investment firm, maximize profit as a function off hours spent, increase likelihood fiscal possibility will not operate at a loss, etc.).

A configuration component 610 arranges at least one parameter related to the selected product or service. Based on an outcome of the match component 608, a selected product or service has parameters that are to be established. For instance, the match component 608 can select a loan for providing capital to a company. The configuration component can establish term of the loan, interest rate of the loan, suggest collateral for the loan, etc.

Knowledge of a product or service for user can be useful in creating a presentation. A generation component 610 creates a presentation that relates to the fiscal possibility based upon the obtained information. A presentation can be used to convince a client to engage in a transaction with an investment firm operating the system 600 (e.g., allows the investment firm to gain benefits of the financial opportunity). While stated as being operated by a company pursuing a financial opportunity, it is to be appreciated that aspects of the subject specification can take place by a third party on behalf of an entity (e.g., investment company). Example presentations include digital slide arrangements, folders, pamphlets, videos, sketch drawings, etc.

A schedule component 504 organizes time of at least one person as a function of a fiscal possibility, where the person with organized time relates to the created presentation. While a presentation generates automatically, it can be beneficial to have at least one individual designated to disclosing the presentation to a prospective client. In addition, the schedule component 504 can designate a person to supervise a financial opportunity. The schedule component 504 can view metadata relating to different people based on analysis of the metadata, a person can be designated to a financial opportunity and a portion of their time can be allotted to the opportunity. For instance, the schedule component 504 can view time allotments, priority notices, previous experience, etc. in determining an individual to designate to a project (e.g., designation by filling calendar time for a person with time for the financial opportunity).

A manage component 402 regulates at least one auxiliary task associated with the presentation. Commonly, a number of different tasks take place following disclosure of a presentation. Example tasks include transmitting follow-up correspondences, scheduling supplemental telephone calls, docketing events that occur after the presentation, etc.

Figure 7:
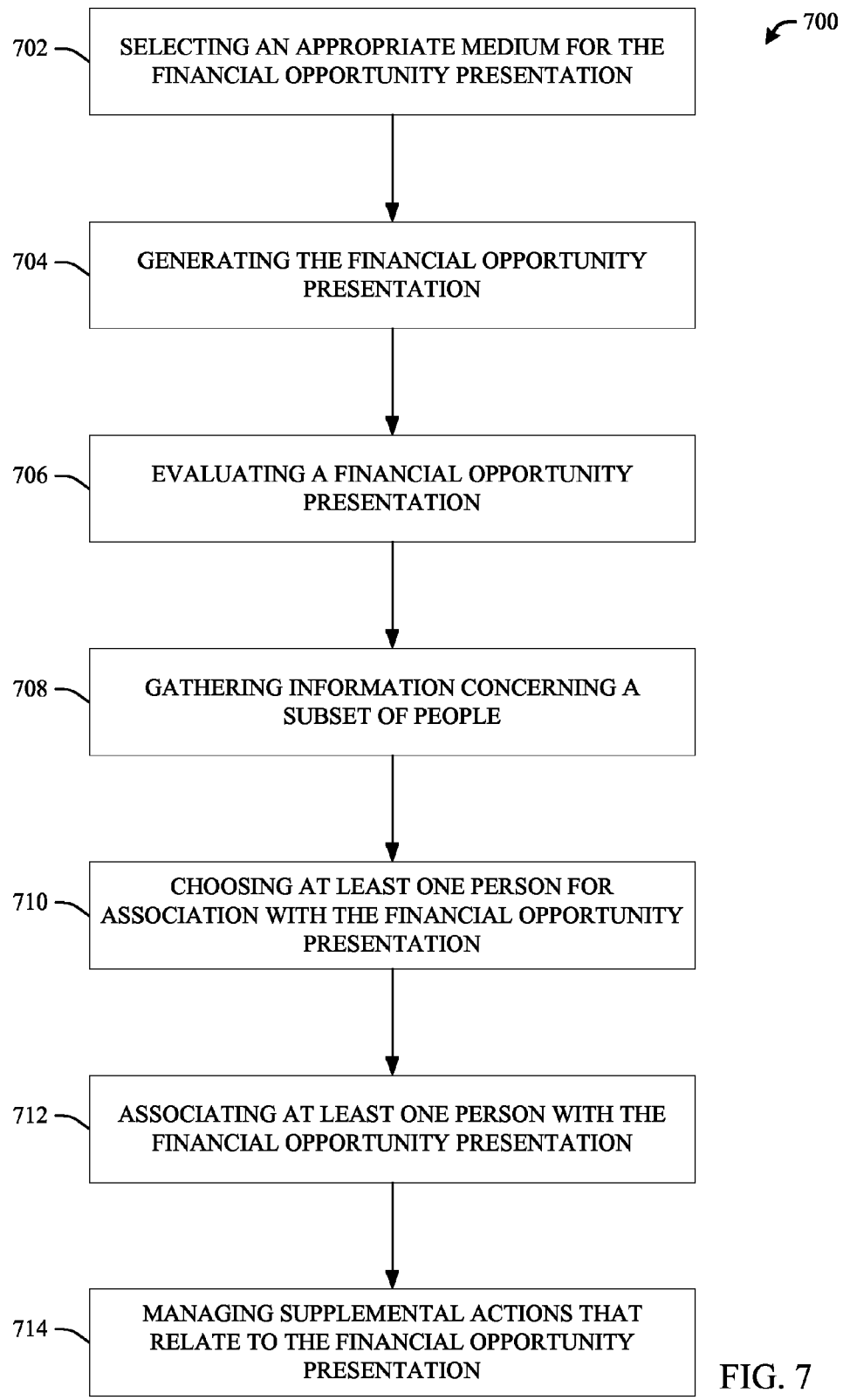
FIG. 7 illustrates a representative financial opportunity pursuit management methodology in accordance with an aspect of the subject specification.

FIG. 7 is an example methodology 700 for scheduling time in association with pursuit of a financial opportunity. There is selecting an appropriate medium for the financial opportunity presentation 702, where the financial opportunity presentation is typically generated according to the selected medium. A presentation is commonly disclosed across at least one medium (e.g., audio, visual, etc.). For a particular financial opportunity, one medium can be more applicable to another medium. For instance, if a presentation is given over a telephone call, then it is likely be better to use an audio presentation medium then a visual presentation medium. Selection can be for a 'best' medium; however, selection can take place for an appropriate medium (e.g., a medium capable of communicating a set of data).

Generating the financial opportunity presentation 704 occurs. A presentation is created concerning the selected medium in order to pursue the financial opportunity. According to one embodiment, a shell is created upon the medium and then relevant information is populated into the shell. An example presentation includes an explanation of the financial opportunity (e.g., that a company could gain capital to increase production and make more profits), recommended products/services (e.g., taking out a loan with a bank to gain capital), rationale to use the products/services (e.g., reasons why a loan is selected over other options, reason why a particular provider should be used, etc.), etc.

Evaluating a financial opportunity presentation 706 takes place. Analysis of the presentation can provide beneficial metadata that can assist in disclosure of the presentation. For instance, a slide show presentation could benefit from having a human broadcaster associated with the presentation. Other forms of presentations can be open-ended on people that are to associate. In one example, a presentation can be a role-play with multiple characters; however a range of individuals can participate in the role-play (e.g., about five to about eight people). Evaluation can determine a suitable number of presenters for disclosure, support staff, supervisors, etc.

Event 708 is gathering information concerning a subset of people; commonly, a person associated with the financial opportunity presentation is included in the subset of people. In order to determine individuals to associate with a presentation, information about available individuals is obtained. In an illustrative instance, an evaluation (e.g., act 706) determines that fifteen hours of time should be dedicated to the presentation (e.g., disclosing the presentation, performing follow-ups, etc.). Event 708 gathers data for time availability for employees of a practice group related to financial opportunity pursuit.

Choosing at least one person for association with the financial opportunity presentation 710 occurs. Select logic and algorithms can be used to determine individuals to associate with a presentation. For instance, evaluation at act 706 can determine that an expert should disclose a presentation. Therefore, when selecting an individual for association, their background is evaluated to determine if there is an appropriate individual. Example factors that can be used in choosing at least one person for association include time available, background, title, position, knowledge, extraneous factors (e.g., is an individual listed as someone who is charismatic), industry contacts, training, etc.

There is associating at least one person with the financial opportunity presentation 712, commonly individuals chosen in act 710. Association can include designating a portion of the person's time to the financial opportunity presentation. Association allows for a linkage between an individual and the presentation (e.g., assigning the individual to tasks related to the presentation). According to one embodiment, association takes place through automatic manipulation a calendar of a chosen individual to add time dedicated to the presentation.

Action 714 is managing supplemental actions that relate to the financial opportunity presentation. Even after a presentation is disclosed, there can be a number of associated tasks related to the presentation (e.g., scheduling when the presentation is to take place, gaining feedback on the presentation, making follow-up requests based on the presentation, etc.). Management can include assigning personnel to tasks, automatically performing tasks, assigning time for task performance, etc.

Figure 8A:
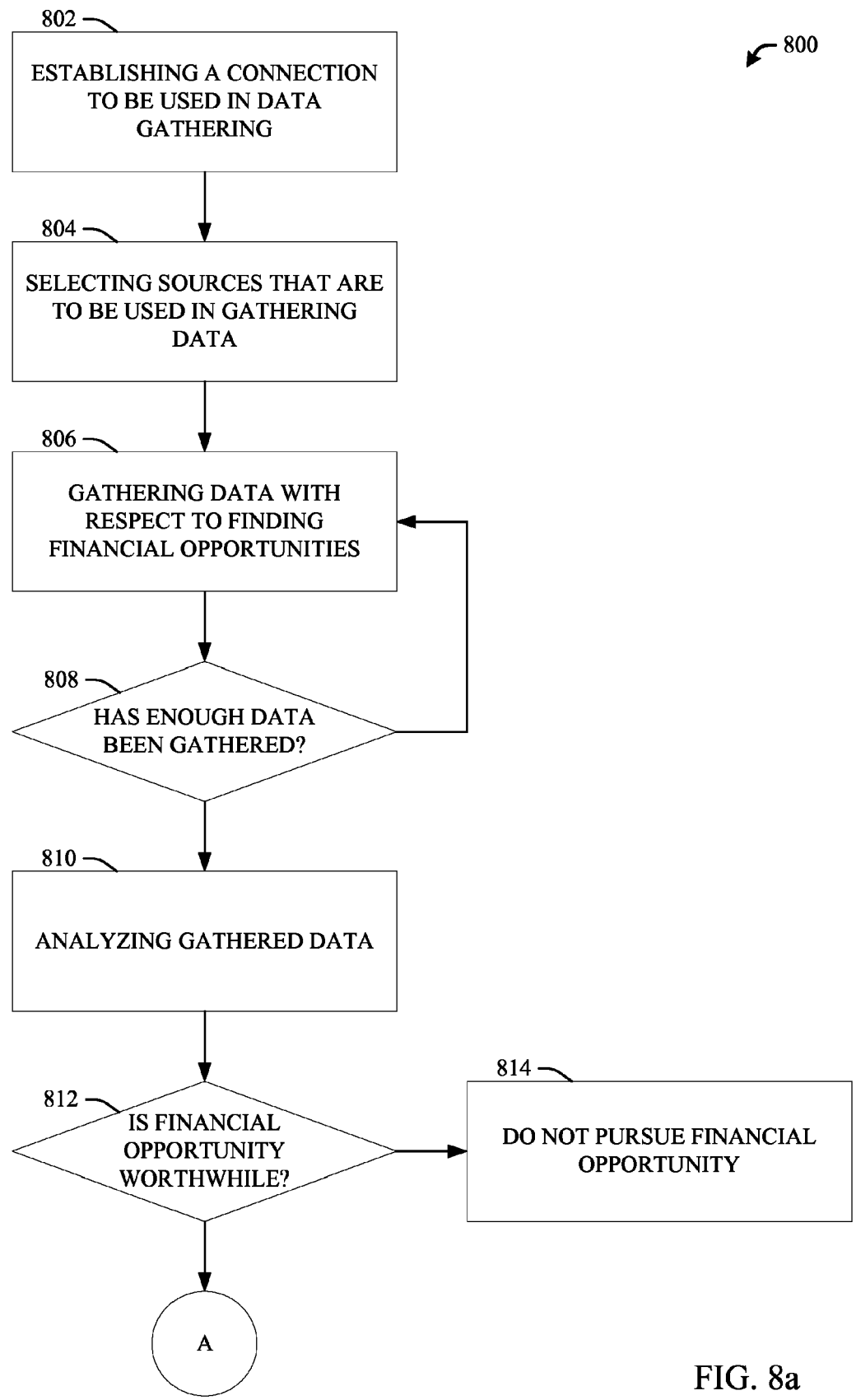
FIG. 8a illustrates a first part of a representative financial opportunity pursuit methodology in accordance with an aspect of the subject specification.
Figure 8B:
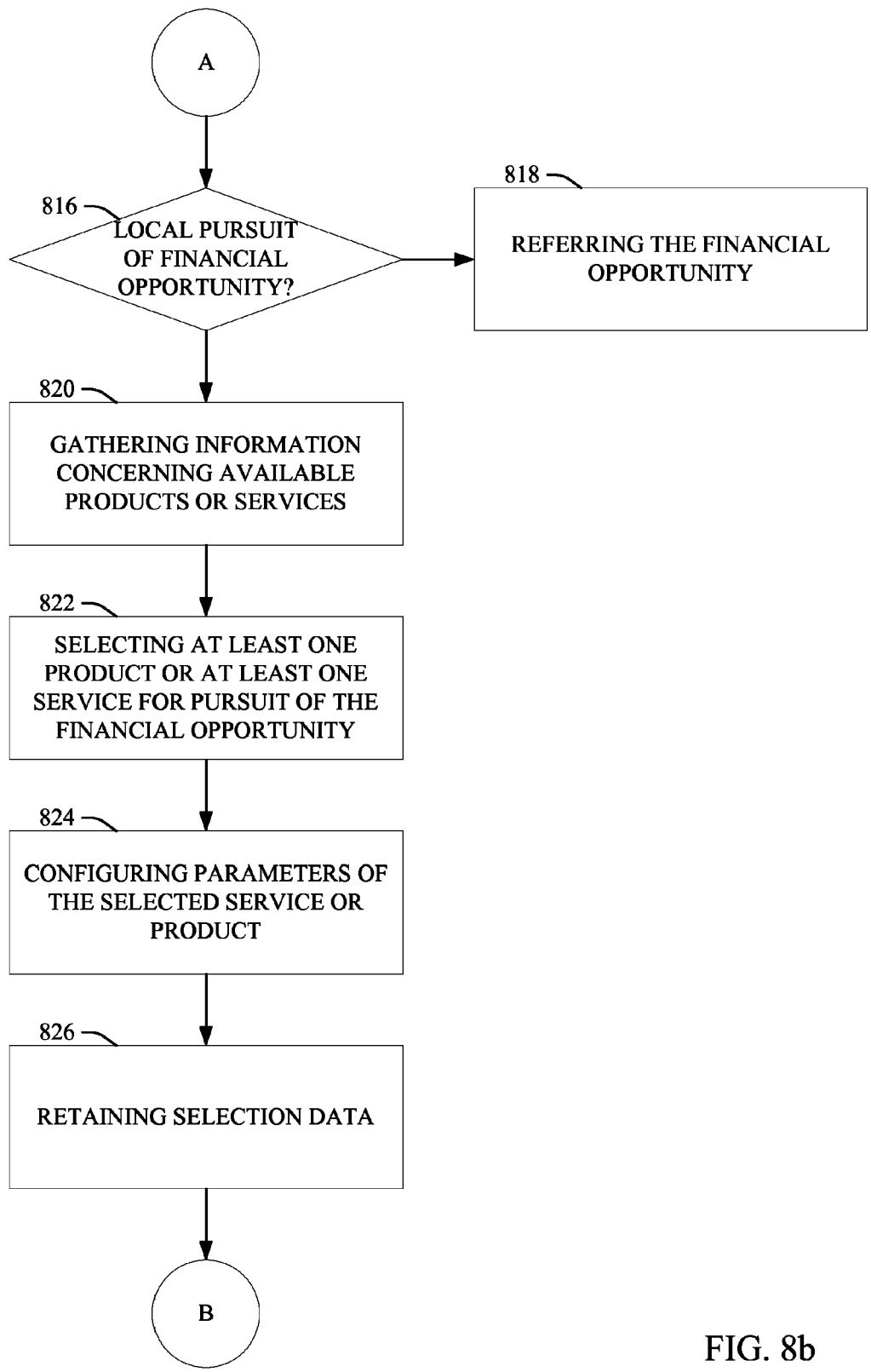
FIG. 8b illustrates a second part of a representative financial opportunity pursuit methodology in accordance with an aspect of the subject specification.
Figure 8C:
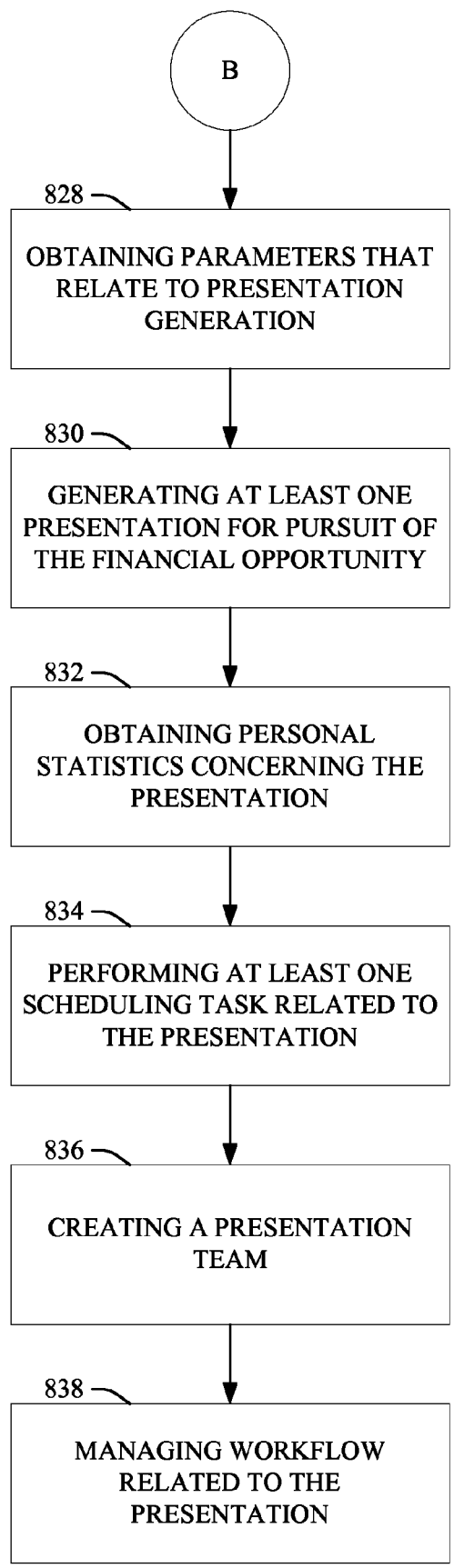
FIG. 8c illustrates a third part of a representative financial opportunity pursuit methodology in accordance with an aspect of the subject specification.

FIG. 8a, FIG. 8b, and FIG. 8c disclose an example methodology 800 for performing actions upon a financial opportunity. There is establishing a connection to be used in data gathering 802. In order to gathered data, it is common to establish an electronic link to allow for information gathering. Example connections include "logging-on" to the Internet, configuring with a monitor to receive user input, integrating with a scanner to receive optical images of information, etc.

Selecting sources that are to be used in gathering data 804 occurs. A large number of sources transferring information to a system operating the methodology 800 can become overwhelming and slow down system operation. To minimize consumption of system resources in information gathering, some sources can be eliminated as suppliers of information. For instance, a financial report website can be signaled as a source that historically produces quality information; therefore, the financial report website is selected for data gathering. However, a social networking website can produce little information on financial opportunities, so the social networking website is deselected for information gathering (e.g., information is not gathered from the social networking website).

Gathering data with respect to finding financial opportunities 806 can take place. Data obtainment can occur according to a number of different embodiments. Passive observance of communications occurs, where observed communications are subjected to a semantic search. It is to be appreciated that use of a semantic search is disclosed as an example and other implementations can be practiced. Information sources can be actively scoured according to a semantic search to determine relevant information that is then extracted. Receiving communications intended to be included in gathered information, such as an input request from an entity (e.g., filling out a form presenting a financial opportunity), can be obtained. It is to be appreciated that other obtainment configuration can be practiced to gather information.

A check 808 takes place to determine if enough information has been gathered to perform an accurate evaluation of the financial opportunity. An amount of information is compared against an established standard. For instance, a system operating the methodology 800 can have a standard that if a fiscal prospect has an expected profit of about $1,000,000 US Dollars, then about fifty pieces of any quality of information should be gathered for the check to be cleared. If enough information has not been gathered, then the methodology 800 can retract to event 806 to gather more information (e.g., gather enough information to be accepted by the check 808).

There is analyzing gathered data 810; rules are applied against a subset of gathered data and various inferences and determinations are made as a result or application of the rules. In an illustrative example, a subset of gathered data that is the whole set is applied with a rule disclosing that if three or more United States patent applications are filed towards a product, then there is a high likelihood there is licensing potential. Therefore there can be an indication that a related financial opportunity (e.g., financing a loan for production of the product) is worthwhile.

Verification 812 determines if a financial opportunity is worthwhile to pursue. A variety of different factors can be taken into account to determine if a fiscal prospect with a worthwhile endeavor. For instance, results of analyzing gathered data 810 can be provided a numerical result (e.g., positive for results that indicate the opportunity should be pursued, negative if the opportunity should not be pursued). Numerical results can be summed together and a final number can indicate if the opportunity should be pursued.

A result of the verification 812 can be relative low and thus the methodology 800 instructs a system not to pursue the financial opportunity 814. Action 814 can be a permanent conclusion as well as a temporary conclusion. As a permanent conclusion, the financial opportunity is disposed of and no longer considered active. A message can be transferred indicating the financial opportunity should not be re-evaluated. However, action 814 can transfer back to 806 where more information is gathered and further evaluations take place.

A check 816 can take place to determine a party that should pursue the financial opportunity. While a fiscal prospect can be beneficial, there are possible situations that would make local pursuit too risky, difficult, etc. For example, a fiscal opportunity with a projected razor thing profit margin could be too risky for pursuit of a large investment firm. However, smaller firms can desire to pursue the low profit margin deals and the large investment firm can refer the financial opportunity to smaller firms who pay a fee (e.g., a monthly fee to receive a referral list).

There is typically referring the financial opportunity 818 to another party. This often takes place when there is not to be local pursuit; however, it is possible for there to be both local pursuit and a referral. Referral can take place to at least one or more entities where the referral includes limited information (e.g., opportunity and critical information, such as company name) as well as detail information about the opportunity (e.g., why the opportunity is considered worthwhile, why a firm operating the methodology 800 is not pursing the opportunity, etc.). A record can be made in storage concerning a party that received a referral as well as how they responded to the referral (e.g., did the party pursue the referral).

There is gathering information concerning available products or services 820. If a financial opportunity is to be pursued, then certain products and or services can be used to improve (e.g., maximize) an outcome for the financial opportunity. A database can be accessed of available products and service and a list can be provided containing different possibilities. If a company would like to develop a franchise model where investors purchase franchise rights to run a company branch in an area, then a possible product can be a loan for investors to cover a franchise fee. If a company is having accounting difficulties, then a software product can be recommended that allows the company to streamline accounting procedures.

Selecting at least one product or at least one service for pursuit of the financial opportunity 822 takes place; the selection can take place automatically though trained logic. A number of factors can be used in determining an appropriate service and/or product. For instance, a construct related to the financial opportunity can be operating on a limited budget. Therefore, choices are made with total cost of products/services in mind. However, if a company is small, then a combination of too many products and/or services can be overwhelming, so an attempt can be made to select a single product or service so pursuit does not become overcomplicated.

Configuring parameters of the selected service or product 824 takes place. A variety of parameters can associate with a selected product and/or service; these selected parameters can be influential in determining if a financial opportunity is realized (e.g., a potential clients purchases a selected product and/or service). For example, if a loan is selected as a product, the interest rate on the loan can determine success of the financial opportunity. If the interest rate is too high, then the client could be unlikely to purchase the produce. However, if the interest rate is too low, then the financial opportunity can become unprofitable and/or become wasteful (e.g., resources are dedicated to this financial opportunity while the resources could have been dedicated to a more fruitful fiscal prospect). Therefore, event 824 can attempt to configure the selected product/service in manner that improves usefulness of the financial opportunity.

There is retaining selection data 826 that enables monitoring of an outcome for the financial opportunity. If a parameter was selected and an undesirable outcome was achieved (e.g., a selected product and/or service was not purchased by a potential client relating to the financial opportunity), then there can be an indication that a parameter was incorrectly selected. Parameter selection logic can be modified in order to produce improved results. Testing of modifications can take place (e.g. parameter selection logic modification, rule alteration, etc.) in order to improve results.

Action 828 is obtaining parameters that relate to presentation generation. In order to explain a manner in which a financial opportunity will be taken advantage of, a presentation is used to convey information. To create a beneficial presentation, parameters should be learned that could be used in creating the presentation. For instance, if a loan is to be provided to a group of deaf individuals, then sounds would likely not be useful and a parameter would be that sound should not be included in the presentation. Additionally, if a presentation is to be provided over a teleconference, action 828 can obtain parameters that relate to equipment that will be used in the teleconference (e.g., telephones without video capabilities, telephones with poor sound detail communication, etc.). Parameters can be that visual effects should not be used and high detail sounds should not be used since they will likely not be conveyed by the equipment.

There is generating at least one presentation for pursuit of the financial opportunity 830. A common presentation includes gathered information, inferences made from gathered information, statistics and probabilities that relate to the financial opportunity, suggested and alternative products and services, etc. Example presentations include computer slide shows, pamphlets, pitchbooks, etc. A system operating the methodology 800 can use internal logic mechanisms to determine how to configure the presentation in view of obtained parameters.

Obtaining personal statistics concerning the presentation 832 occurs. In a company, different employees can have varying backgrounds, experiences, contacts, skill sets, etc. Event 832 gathers statistical information for at least one person; statistics disclose different traits related to a person. If an individual has a history of closing small financial opportunities for a profit though mechanisms disclosed in the subject specification, then information concerning the success is gathered and used in other actions to attempt to place the person on a proper team.

Event 834 is performing at least one scheduling task related to the presentation. Various scheduling capabilities can become important when determining how a presentation can be disclosed. For instance, conventionally it can be beneficial for a Chief Executive Officer (CEO) to disclose a presentation. However, many CEOs have limited amounts of time and cannot dedicate time to small transactions. Therefore, a scheduling task can be to evaluate priority of time scheduled to a person and determining if the person can be dedicated to the presentation (e.g., slotted to disclose the presentation).

Act 836 is creating a presentation team, where a team is one or more individuals and/or entities. A team is created that divulges the presentation (e.g., three people lead a discussion with the presentation as a guide, one person arranges meetings and makes initial contacts while another provides the presentation, a single person discloses the presentation, etc.) The created team is conventionally a function of characteristics of individuals, parameters of the presentation, scheduling constraints, etc. A team can also include equipment that is specifically dedicated to a team (e.g., a laser printer that the team can use in manufacturing a generated presentation.)

There is managing workflow related to the presentation 838. There can be a number of duties that relate to a presentation. For example, once a presentation is provided, follow-up correspondences can attempt to close a financial transaction. Event 838 can determine what should be done, what can be performed automatically, individuals (e.g., members of the team, support staff, etc.) that should perform specific workflow tasks, etc. Management can be dynamic that allows for changes as situations change.

Figure 9:
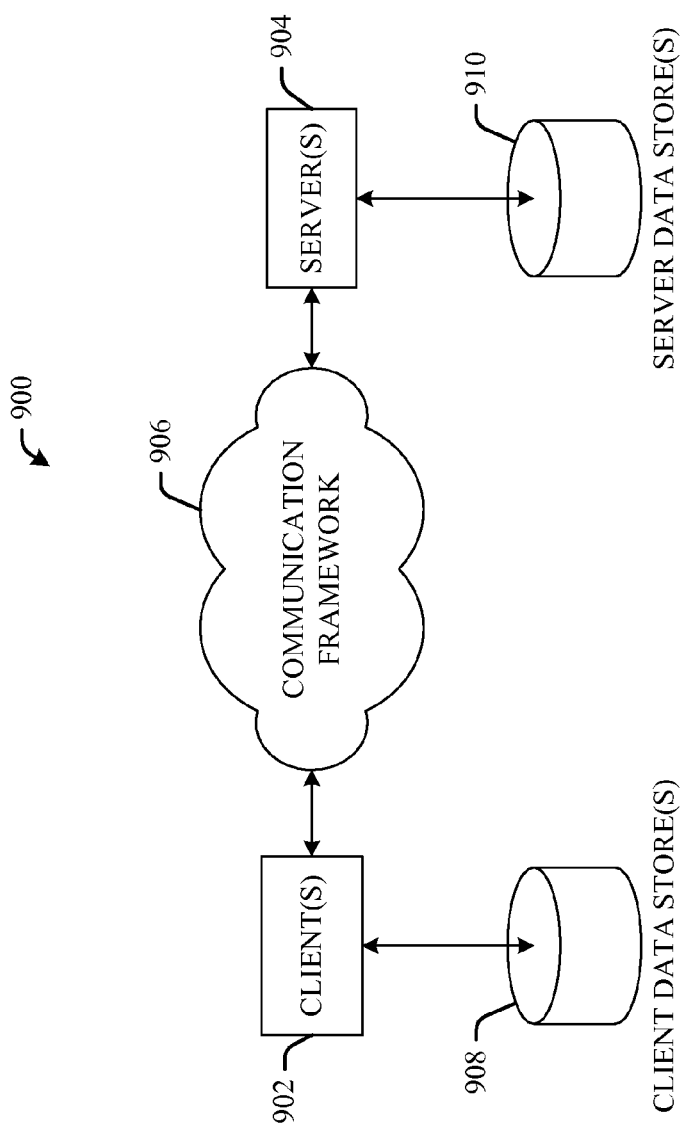
FIG. 9 illustrates an example of a schematic block diagram of a computing environment in accordance with the subject specification.
Figure 10:
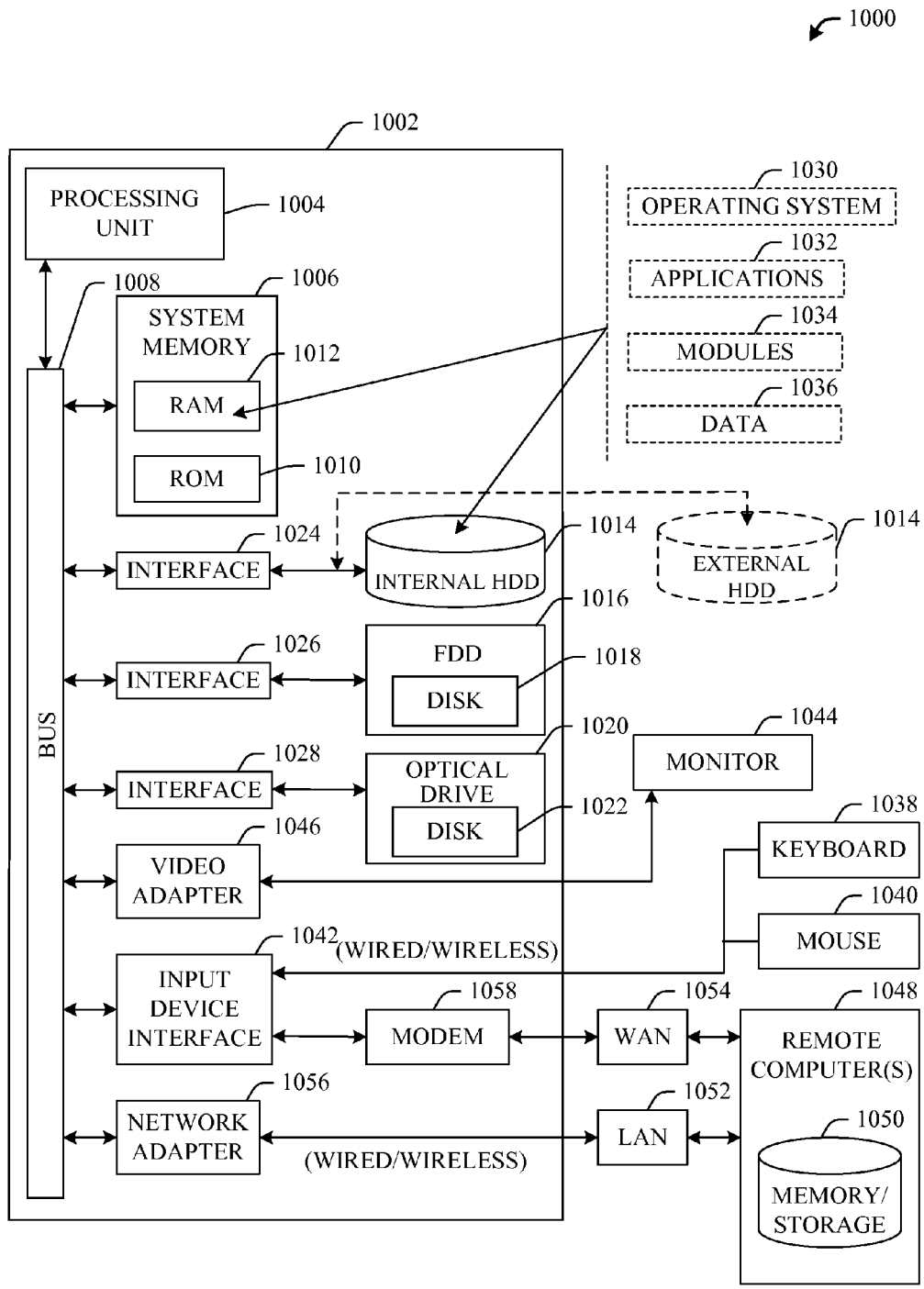
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
    at least one processor coupled to a memory, the processor executing:
    a gather component that obtains information that relates to an investment banking opportunity;
    a decision component that resolves a subset of the obtained information for use in generation of a presentation;
    a generation component that creates the presentation that relates to the investment banking opportunity based upon the subset of the obtained information, wherein the presentation relates to one or more products or services associated with the investment banking opportunity and conveys at least one rationale for utilization of the one or more products or services; and
    a match component that selects the one or more products or services based at least in part on an analysis of the investment banking opportunity in conjunction with a set of rules.

2. The system of claim 1, further comprising a schedule component that organizes time of at least one person as a function of the investment banking opportunity, wherein the schedule component modifies at least one schedule associated with the at least one person to allocate time associated with the presentation.

3. The system of claim 2, wherein the schedule component organizes time with regards to the person's experience, availability, interest, locality, contact, performance evaluation, or a combination thereof.

4. The system of claim 2, further comprising a prioritization component that provides precedence data to the schedule component, wherein the schedule component bases organization of time at least in part off precedence data.

5. The system of claim 1, further comprising an evaluation component that analyzes obtained information, wherein at least one result of the analysis is used in selection of an appropriate presentation medium.

6. The system of claim 1, further comprising an administration component that schedules a time for the presentation.

7. The system of claim 1, further comprising a parameter component that evaluates characteristics taken into account in creation of the presentation.

8. The system of claim 1, further comprising a team component that organizes a cooperative to operate in conjunction with the created presentation.

9. The system of claim 1, wherein the presentation comprises at least one of a digital slide show, a word processing document, an audio speech, a brochure, a spreadsheet, or a pitchbook.

10. The system of claim 1, wherein the obtained information is obtained from at least one of a user submission, communication traffic monitoring, scanned images, statistical information, and network searches.

11. The system of claim 1, wherein the gather component obtains information from at least a first source of the obtained information based at least in part on a historical reliability of the first source; and wherein the gather component does not obtain information from at least a second source of the obtained information based at least in part on a historical reliability of the second source.

12. The system of claim 1, further comprising a recommendation component that refers the investment banking opportunity to an auxiliary provider.

13. The system of claim 1, further comprising a filter component that screens a portion of the obtained information that is immaterial to the presentation.

14. The system of claim 1, further comprising a configuration component that sets one or more terms of the investment banking opportunity.

15. The system of claim 1, further comprising a manage component that creates a task list related to the presentation.

16. The system of claim 15, wherein the task list includes at least one of scheduling a time for the presentation, conducting a follow-up related to the presentation, and a reminder to contact a party related to the presentation.

* * * * *